United States Patent Office

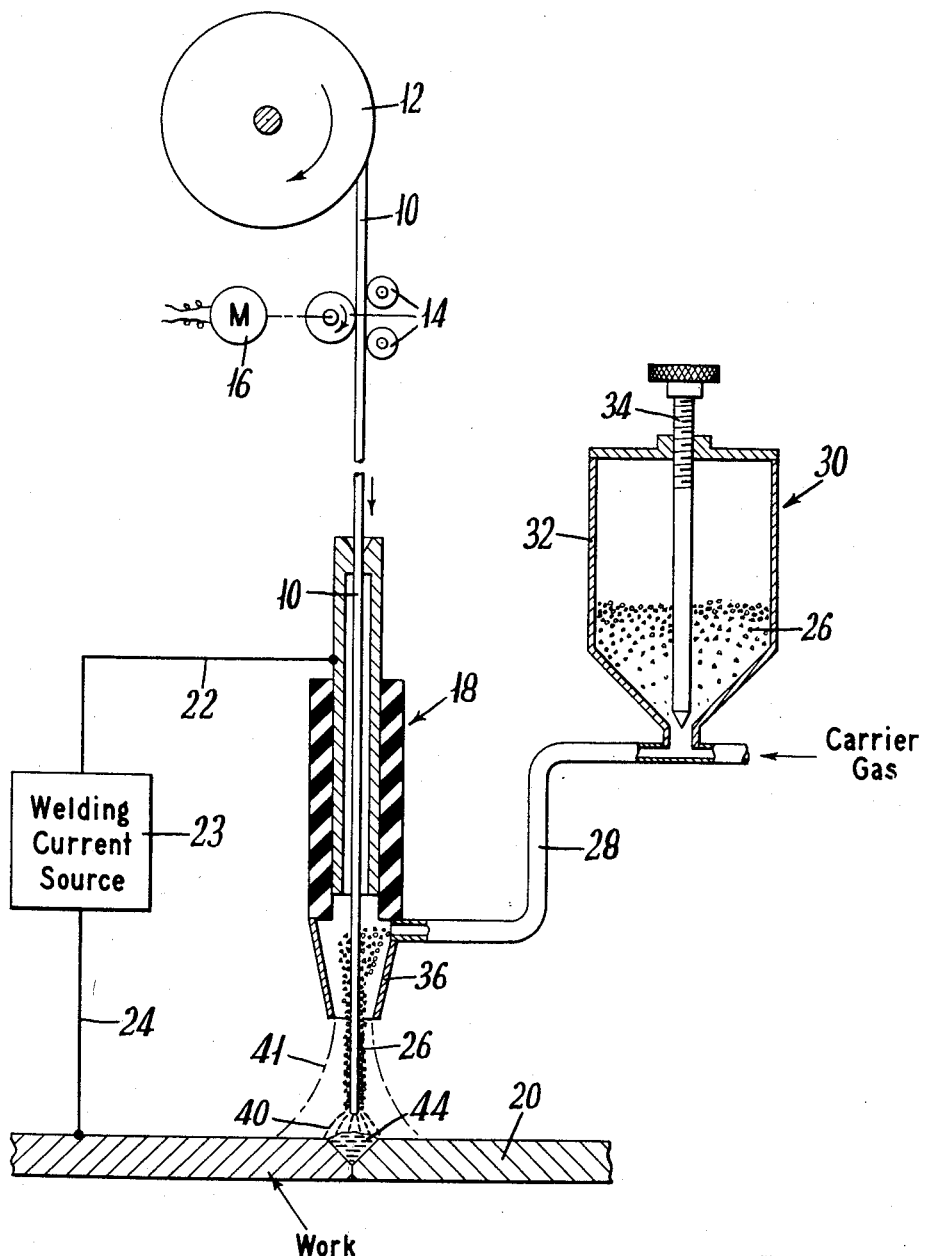

2,920,181
Patented Jan. 5, 1960

2,920,181

ELECTRIC ARC DEOXIDIZED METAL DEPOSITION

Harry E. Rockefeller, Bronxville, and Jack L. Wilson, Niagara Falls, N.Y., assignors to Union Carbide Corporation, a corporation of New York Application May 4, 1956, Serial No. 582,833

2 Claims. (Cl. 219—74)

The present invention relates to gas shielded electric arc deoxidized metal deposition and, more particularly, to such a process wherein a bare metallic electrode filler wire is employed.

In sigma welding and surfacing, a continuous, consumable electrode process used extensively throughout industry for all types of welding and surfacing procedures, an inert gas shielding medium is employed to offer protection to the molten metal against reaction with the atmosphere. For most such operations, argon, helium, a 5% oxygen-argon mixture, or other gaseous media are employed and a gas flow of from 40 to 60 cubic feet per hour is very often required for adequate protection. Even with this amount of gas shielding, however, porosity may still be caused by incomplete deoxidation of the molten puddle. Accordingly, electrodes of various compositions containing balanced deoxidizing agents, such as silicon, manganese, aluminum, etc. are employed, and it is the combination of these special electrodes plus an adequate blanket of shielding gas that is generally required to protect the molten metal effectively. Furthermore, when the deoxidizing agents are added to the initial heat from which the special rods are formed, difficulty is incurred in retaining the required amounts of deoxidizers due to their tendency to oxidize and be lost to the slag. The general procedure is to add an excess of the deoxidizing material to the melt with the understanding that such losses will occur.

Since electrodes having special deoxidizing agents incorporated in their composition are costly, a real need exists for a new simple and inexpensive process for deoxidizing the molten metal effectively. Such a new process would further increase the efficiency and economy of sigma welding and surfacing if the shielding gas flow rate requirements could also be reduced without sacrificing the soundness of the welds produced.

It is also desirable to be able to vary the amount of deoxidizer added to the weld puddle dependent upon the amount present in the base material. Such a new process would make it possible to adjust the amount of deoxidizer added to balance the requirements with the base material being welded, and the protection afforded from the shielding gas.

The principal object of this invention, therefore, is to provide a method of deoxidizing deposited metal in gas shielded metal arc welding and surfacing wherein the necessity of employing electrodes having special deoxidizers incorporated within their composition is completely eliminated.

Another object of the invention is to provide a superior deoxidizing process which materially reduces the amount of inert gas shielding that is normally required in shielding gas metal arc deposition.

A further object of the invention is to provide a method for adjusting the amount of deoxidizer added during the deposition of weld metal.

Other aims and advantages of the invention will be apparent from the following description and appended claims.

In accordance with the present invention, a process is provided for the electric arc metal deposition, employing a bare metallic wire electrode, wherein the electrode and a metallic workpiece are connected to a source of electric power, the electrode is fed toward the workpiece to establish and maintain an arc in the deposition zone on the workpiece, and a coating of powdered deoxidizing mixture containing a deoxidizing component, a magnetic component and substantially free of slag-forming fluxing components is provided on the bare metallic wire electrode, while a stream of shielding gas is concurrently fed around the electrode to exclude atmospheric air from the arc and deposition zone.

As the bare metallic wire electrode is fused and deposited on the workpiece together with the coating of powdered deoxidizing mixture, the constituents of the deoxidizing mixture pass to the deposition zone and there act to remove oxygen from the molten puddle in the deposition zone.

The powdered deoxidizing mixture containing the magnetic component is carried by the shielding gas stream to the vicinity of the current-carrying bare metallic wire electrode at such a flow rate as to uniformly coat the electrode, adherence to the electrode being effected by the magnetic field set up about the current-carrying electrode.

The quantity of magnetic component required in the powdered metallic alloying mixture is determined by the intensity of the magnetic field developed about the electrode by the magnitude of current employed as well as by the magnetic permeability of the magnetic component. The quantity of the magnetic component of such powdered deoxidizing mixture must be sufficient to cause substantially all of the powdered deoxidizing mixture to adhere to the electrode.

The powdered deoxidizing mixture is formed by grinding the non-magnetic deoxidizing components to a uniform size and adding a magnetic component. These components are carefully mixed with a suitable binder such as sodium and/or potassium silicate. The resultant mixture is then dried and baked at about 500° F. to 600° F. and then granulated to the proper mesh size for use. The resultant product is the powdered deoxidizing mixture employed in the process of the invention. For example, ferrotitanium and zirconium-silicon are non-magnetic, and from 15 to 20% by weight of iron powder was mixed with these deoxidizers. The mixtures were bonded with approximately 5% by weight of aqueous sodium silicate solution, baked at 550° F. to bond the components and drive off the moisture, and were then recrushed and screened to 20 by D mesh size.

It is also possible to fuse a mixture where the resultant deoxidizing mixture possesses magnetic permeability without subsequent addition of a magnetic component. For example, a series of tests was performed in accordance with the invention, wherein various deoxidizing agents were added to the weld metal in the form of alloys of the respective deoxidizers. The deoxidizers utilized in the tests were:

Silicon as 15% ferrosilicon
Aluminum as 15% ferroaluminum

The shielding gas, after conveying the powdered deoxidizing mixture to the electrode, is distributed about the arc zone in such a manner that it serves to shield the arc and metal deposition zone from atmospheric air.

The shielding gas employed in the process of the invention may broadly comprise any shielding gas used heretofore in gas shielded metal arc welding, such as argon, helium, hydrogen, and carbon dioxide, or mixtures thereof, with or without minor amounts of oxygen up to approximately 15 percent.

It is a requisite of the process of the present invention that the powdered deoxidizing mixture is free of substantial amounts of fluxing agents, such as silicates and the like, which are commonly employed in granulated form as the shielding media in submerged-melt metal arc welding. Such fluxing agents leave slag deposits covering the deposited metal which require a considerable amount of operator effort in removal by chipping. In the process of the present invention, effective shielding of the arc and deposition zone from atmospheric air contamination is provided by the gaseous shielding media and deoxidizing mixture without requiring the use of fluxing agents which not only form slags, but affect the physical and chemical properties of the deposited metal.

The particle size of the powdered deoxidizing mixture employed may vary over a wide range, the limits being determined by the dimensions of powder passages of the equipment and by the ability to disperse and suspend the powders in the carrier (shielding) gas stream.

It has been found necessary, for the efficient performance of the process of the invention, to correlate the electrode wire metal deposition rate with the powdered deoxidizing mixture flow rate. As the current is increased, for a given diameter electrode at a given voltage, the metal deposition rate is proportionally increased. It has been found that, for a given shielding gas, the gas flow rate is partially dependent on metal deposition rate resulting from increased current. Accordingly, the gas flow rate is increased to provide ample shielding for the additional metal deposited. However, for higher metal deposition rates, the powdered deoxidizing mixture flow rate must also be proportionally increased. Such correlation of electrode wire deposition rate and powdered deoxidizing mixture flow rate, required for a given operation, within the ranges stated hereinabove, is readily determinable by one skilled in the art.

The use of powdered deoxidizers in this manner permits a very considerable reduction in the shielding gas flow required by prior gas shielded metal arc deposition processes without sacrificing the quality of the resultant weld. In some instances, an improvement in weld quality over that obtained in prior art high gas flow processes without a deoxidizer addition is evident. Furthermore, the effect of the magnetic powdered deoxidizing mixture addition is very similar to the effect achieved when such deoxidizers are incorporated as part of the electrode composition. The prime significance of the present invention, therefore, is the reduction in the amount of shielding gas necessary to produce sound welds and the elimination of the need for melting, forging, rolling, and cold-drawing welding electrodes containing a variety of deoxidizers. With the present process, a single, inexpensive mild steel electrode may be employed under all conditions merely by the addition thereto of easily prepared powdered materials.

Apparatus suitable for practicing the method of the invention is schematically shown in the single figure of the drawing. As there shown, a metal electrode rod or wire 10 is drawn from rod reel 12 by rod feed rolls 14, driven by variable speed motor 16 and fed through gun 18 toward workpiece 20. A power cable 22 passes from the current source 23 to gun 18 where it energizes rod 10, while a similar cable 24 is connected to workpiece 20 to complete the electrical circuit. Powdered deoxidizing mixture 26 is borne to the gun 18 in the shielding gas stream through conduit 28. The powdered mixture is introduced into the shielding gas through powder dispenser 30 in the gas stream. Dispenser 30 comprises closed hopper 32 into which powdered mixture 26 is stored and metering pin 34 which controls the rate of powdered mixture flow to the carrier gas stream. The powder dispenser may be of any type known to the art, a gravity-feed type being shown merely by way of illustration.

The powdered deoxidizing mixture 26 passing from hopper 32 of dispenser 30 passes into and is suspended in the carrier gas stream of conduit 28 which communicated with nozzle 36 of the gun 18.

As electrode rod 10 is struck to the workpiece 20 to initiate the arc 40 and begin the metal deposition operation, shielding gas is discharged from the nozzle around rod 10 to form a shielding envelope 41 around the arc 40. The suspended powdered deoxidizing mixture 26 is carried into nozzle 36 of gun 18 and, due to its magnetic component, is attracted to the current-carrying electrode rod 10 and forms a uniform coating thereon. The deoxidizing mixture coating is fed with the electrode rod 10 and passes into the molten deposition zone 44.

Each deoxidizer was added to the gas stream in varying ratios to the electrode deposition rate to determine their deoxidizing capacity under various inert shielding gas flow rates. Needless to say, the number of deoxidizing combinations with relationship to the numerous gas flow rates may vary widely. Optimum conditions for the utilization of any deoxidizer with relationship to the minimum gas flow rate required may be easily established for any given welding condition from the broader limits set forth herein.

The additions of single deoxidizers indicated that silicon, for instance, in amounts of from 0.4 to 0.8% of the weight of the electrode deposited, not only improved deoxidation with conventional mild steel welding wire but that an extremely sound weld, free from porosity, could be produced with only 15 c.f.h. flow rate of a 5% oxygen-argon shielding gas when using 300 amperes welding current.

Zirconium-silicon in an amount approximating 0.4% (zirconium content) of the weight of the electrode deposited was also exceedingly effective in this respect at a similar gas flow rate.

Aluminum and titanium likewise proved efficient deoxidizers in quantities of 0.2% and 0.8%, respectively, of the weight of the electrode deposited, with optimum results requiring from 15 to 20 c.f.h. of 5% oxygen-bearing argon at 300 amperes and from 20 to 30 c.f.h. of the same gas at 400 amperes to produce non-porous, sound welds.

The practice of adding deoxidizers as magnetic granular additions can be applied to combinations of deoxidizers as well. This was substantiated when a series of double and triple deoxidizers, made up of ferroaluminum, ferrotitanium, and zirconium-silicon, was prepared as bonded and crushed mixes and tested under similar welding conditions. The mixes were added in amounts of 0.25% with respect to the amount of electrode melted and were tested with from 15 to 20 c.f.h. 5% oxygen-argon gas flow. Exceptionally fine slag-free welds were produced from the following mixtures:

| Percent Aluminum | Percent Titanium | Percent Zirconium |
|---|---|---|
| 37.5 | 37.5 | 25 |
| 25 | 50 | 25 |
| 50 | 50 | -------- |
| 75 | 25 | -------- |
| -------- | 75 | 25 |

Since welds equivalent in soundness and freedom from porosity could heretofore be produced only by using special electrodes and inert gas flow rates of 40 c.f.h. or in excess, the above results substantiate a marked improvement in flexibility and economy of operation.

It has been experimentally determined that in addition to adding deoxidizers in accordance with the practice described above, the addition of magnetic powder mixtures containing both deoxidizers and alloying additions may be similarly and as effectively practiced.

Hard-surfacing deposits produced by means of the sigma magnetic powder alloying process, described and claimed in copending application Serial No. 582,832, filed concurrently herewith and entitled "Electric Arc High-Alloy Metal Deposition," were applied in which deoxidizing materials in combination with alloying metal were added to the weld in a carrier gas stream. The magnetic metal and deoxidizing powder additions were attracted to the electrode by means of the magnetic field set up around the electrode due to the welding current and sound, uniform, single- and double-layer slag-free surfacing deposits of good appearance were made. Furthermore, it was possible by predetermining the composition of the granular material to produce a predictable hardness range of the surface deposits.

Surface bead welds were deposited on ½-inch thick Type 1045 surface-ground plate with ⅛₆-inch diameter electrode using 300 amperes at 10 i.p.m. travel speed. Approximately 30 c.f.h. of a 5% oxygen-argon mixture was used as the gas shield. The objective of the tests was to make sound, uniform surfacing deposits of the following composition and hardness ranges:

| Nominal Composition | | | | Hardness Range Rockwell C |
|---|---|---|---|---|
| Percent C | Percent Mn | Percent Si | Percent Cr | |
| 0.30 | 1.00 | 0.70 | 2.0 | 30 to 40 |
| 0.35 | 1.00 | 0.70 | 3.5 | 40 to 50 |
| 0.45 | 1.00 | 0.70 | 5.0 | 50 to 60 |

The following powder mixes were chosen as being representative of those which would produce the desired hardness ranges:

| Hardness, Rockwell C | Powder Addition | | Percent High-C FeCr | Percent Low-C FeCr | Percent 50% FeSi | Percent Iron | Percent Deoxidizer [1] |
|---|---|---|---|---|---|---|---|
| | Percent Electrode | G./Min. | | | | | |
| 30 to 40 | 8.7 | 6.7 | 53.2 | | 17.0 | 17.0 | 12.8 |
| 40 to 50 | 13.0 | 10.0 | 64.3 | | 11.3 | 19.0 | 5.4 |
| 50 to 60 | 19.4 | 15.0 | 40.0 | 29.0 | 8.6 | 15.4 | 7.2 |

[1] Deoxidizer—A powder containing aluminum, titanium and zirconium in the proportions of 37.5%, 37.5%, 25%.

The chemical analyses of three particular welds with respect to the composition intended and that actually produced are illustrated in the following table:

| Weld | Percent Carbon | | Percent Manganese | | Percent Silicon | | Percent Chromium | |
|---|---|---|---|---|---|---|---|---|
| | Aim | Actual | Aim | Actual | Aim | Actual | Aim | Actual |
| No. 1: | | | | | | | | |
| 1st layer | 0.25–0.30 | 0.25 | 1.0 | 0.78 | 0.70 | 0.64 | 1.5–2.0 | 1.7 |
| 2nd layer | 0.25–0.30 | 0.21 | 1.0 | 0.80 | 0.70 | 0.69 | 1.5–2.0 | 2.3 |
| No. 2: | | | | | | | | |
| 1st layer | 0.30–0.35 | 0.37 | 1.0 | 0.76 | 0.70 | 0.61 | 3.0–4.0 | 3.23 |
| 2nd layer | 0.30–0.35 | 0.40 | 1.0 | 0.38 | 0.70 | 0.64 | 3.0–4.0 | 3.83 |
| No. 3: | | | | | | | | |
| 1st layer | 0.35–0.45 | 0.40 | 1.0 | 0.78 | 0.70 | 0.72 | 4.0–6.0 | 4.3 |
| 2nd layer | 0.35–0.45 | 0.41 | 1.0 | 0.78 | 0.70 | 0.83 | 4.0–6.0 | 5.3 |

The hardness values, also with respect to those obtained in relationship to those which were intended, of the above surface deposits are set forth below:

| | Weld No. 1 | | Weld No. 2 | | Weld No. 3 | |
|---|---|---|---|---|---|---|
| | Aim | Actual | Aim | Actual | Aim | Actual |
| 1st layer | 30–40 | 38 | 40–50 | 48 | 50–60 | 53 |
| 2nd layer | 30–40 | 38 | 40–50 | 46 | 50–60 | 54 |

As can be seen, the hardness values obtained were well within the limits predicted.

As shown by X-ray examination, all three hard-surfacing deposits were free of porosity and non-metallic inclusions. The surface quality and efficiency of all the welds were very good and comparable to welds made without powder additions, indicating that with accurate metering and uniform delivery of powdered magnetic materials, welds of predictable orders of composition and hardness may be consistently obtained. Care should be taken, however, to use a powder-to-electrode ratio dependent upon the alloying composition it is intended to deposit. If a mixture richer in the alloying ingredient is formulated and is compatible in every other respect to the practice of the invention, lower powder feed rates with respect to the amount of electrode deposited are possible.

The process of the invention has been successfully employed with direct current sources at both straight and reverse polarities and with alternating current electrical sources, to accomplish both welding and surfacing operations. Manual applications employing the process of the invention have been successfully performed in the downhand, vertical and overhead position.

What is claimed is:

1. The process of electric arc metal deposition wherein a bare metallic wire electrode and a metallic workpiece are connected to a source of electric power comprising, feeding said electrode toward said workpiece to establish and maintain an arc and deposition zone on said workpiece; continuously suspending in a stream of shielding gas a powdered mixture substantially free of slag-forming fluxing components and containing essentially in each particle a deoxidizing component and a magnetic component whereby said particles are magnetically carried by the wire electrode to the deposition zone; continuously feeding said stream around said electrode, whereby said stream shields said arc and deposition zone; and coordinating the rate of suspending said powdered mixture in said stream with the rate of fusion of said electrode, the effect of so-delivering such particles containing such deoxidizing component to such arc as an adherent coating on said wire electrode by virtue of magnetic attraction thereof due to the magnetic component, being to reduce substantially the flow of such shielding gas stream necessary to protect such process from contamination by atmospheric air notwithstanding the fact that such particles are free of slag-forming fluxing components.

2. Process as defined by claim 1, in which such shielding gas stream flow is between 15–30 c.f.h., inclusive.

(References on following page)

References Cited in the file of this patent

UNITED STATES PATENTS

| | | | |
|---|---|---|---|
| 1,347,184 | Smith | July 20, | 1920 |
| 2,003,167 | Alexander | May 28, | 1935 |
| 2,427,350 | Carpenter et al. | Sept. 16, | 1947 |
| 2,669,640 | Outcalt et al. | Feb. 16, | 1954 |
| 2,727,125 | Muller | Dec. 13, | 1955 |
| 2,803,740 | Hyink | Aug. 20, | 1957 |

FOREIGN PATENTS

| | | | |
|---|---|---|---|
| 143,331 | Great Britain | May 27, | 1920 |
| 546,961 | Great Britain | Aug. 7, | 1942 |